United States Patent [19]

Heinsen et al.

[11] 4,232,382

[45] Nov. 4, 1980

[54] INCREMENTING SIGNAL HOLD CIRCUIT FOR A CLOCK/CALCULATOR

[75] Inventors: Edward A. Heinsen, Corvallis, Oreg.; Vijay V. Marathe, Sunnyvale, Calif.

[73] Assignee: Hewlett-Packard Company, Palo Alto, Calif.

[21] Appl. No.: 800,761

[22] Filed: May 26, 1977

[51] Int. Cl.[3] .......... G04C 3/00; G04G 5/02; G06F 7/38

[52] U.S. Cl. .......... 368/1; 364/705; 368/62; 368/187

[58] Field of Search .......... 58/23 R, 50 R, 85.5, 58/152 R, 4 A, 38 R, 57.5, 58; 364/705

[56] References Cited

U.S. PATENT DOCUMENTS

| | | | |
|---|---|---|---|
| 3,813,533 | 5/1974 | Cone et al. | 58/152 R |
| 3,948,036 | 4/1976 | Morokawa | 58/85.5 |
| 4,030,284 | 6/1977 | Portmann | 58/85.5 |
| 4,09 3,992 | 6/1978 | Kawamura et al. | 364/705 |
| 4,158,285 | 6/1979 | Heinsen et al. | 58/152 R |

*Primary Examiner*—Edith S. Jackmon
*Attorney, Agent, or Firm*—Patrick J. Barrett

[57] ABSTRACT

A watch/calculator is disclosed which employs a hold circuit to hold clock incrementing pulses when data from the clock is transferred to calculator circuitry or an arithmetic operation is performed on the data. When the time data is returned from the calculator circuitry to the clock circuitry or the arithmetic operation is completed, the hold circuit releases any held incrementing signal so that an increment signal is not lost, even when the time data is momentarily out of the clock circuitry in the calculator circuitry or other operations are being performed on the time data. Thus, when the time data is returned to the clock circuitry or the operation is completed, the data is incremented or updated as it would have been normally.

10 Claims, 5 Drawing Figures

INCREMENTING SIGNAL HOLD CIRCUIT FOR A CLOCK/CALCULATOR

BACKGROUND OF THE INVENTION

In a U.S. Pat. No. 4,158,285 entitled "Interactive Wristwatch Calculator" filed Feb. 9, 1976 by Edward A. Heinsen, et al., a watch/calculator is disclosed which can perform, inter alia, arithmetic operations with real time quantities to produce a real time answer. This is accomplished by providing means for transferring time data from clock circuitry in the watch/calculator to calculator circuitry and back again. The clock circuitry includes a register for storing data representing time, and this time data is periodically updated or incremented by an incrementer circuit, as is more fully described in the referenced patent application. The calculator circuitry includes registers for storing and arithmetically manipulating data, and one of these registers is connected to the clock register by a bidirectional data bus.

When an arithmetic operation is to be performed on time data, this data must be transferred to one of the calculator registers where the operation is to be performed. However, during the transfer and arithmetic operations process, an update or increment signal could be generated by an incrementer circuit in the clock circuitry. Ordinarily, this increment signal would increment the time data in the clock register by one second, since the update signals occur once a second. However, if the time data is in the calculator circuitry when the increment signal occurs, the update signal will be lost, introducing a one-second error. Repeated operations by the calculator circuitry on time data could result in an undesirable cumulative time error.

SUMMARY OF THE INVENTION

According to the preferred embodiment of the present invention, a hold circuit is provided to hold any increment pulses that would ordinarily be applied to time data stored in a clock register while that data is outside of the clock register, such as during a transfer to the calculator circuitry for arithmetic manipulation. When the time data is returned to the clock register, the hold circuit releases any stored increment signal to appropriately update the time data and thus eliminate any time error that would be caused by missing an increment signal.

DESCRIPTION OF THE PREFERRED EMBODIMENT

Figure 1:
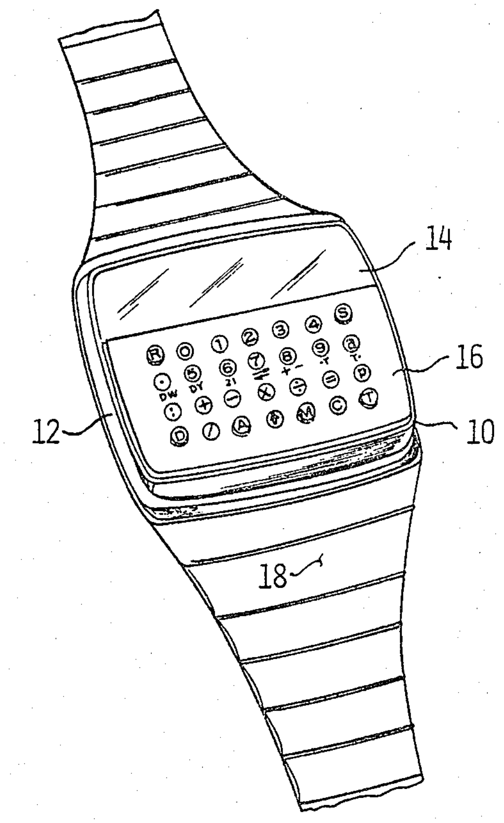
FIG. 1 is a pictorial representation of the watch/calculator.
Figure 2:
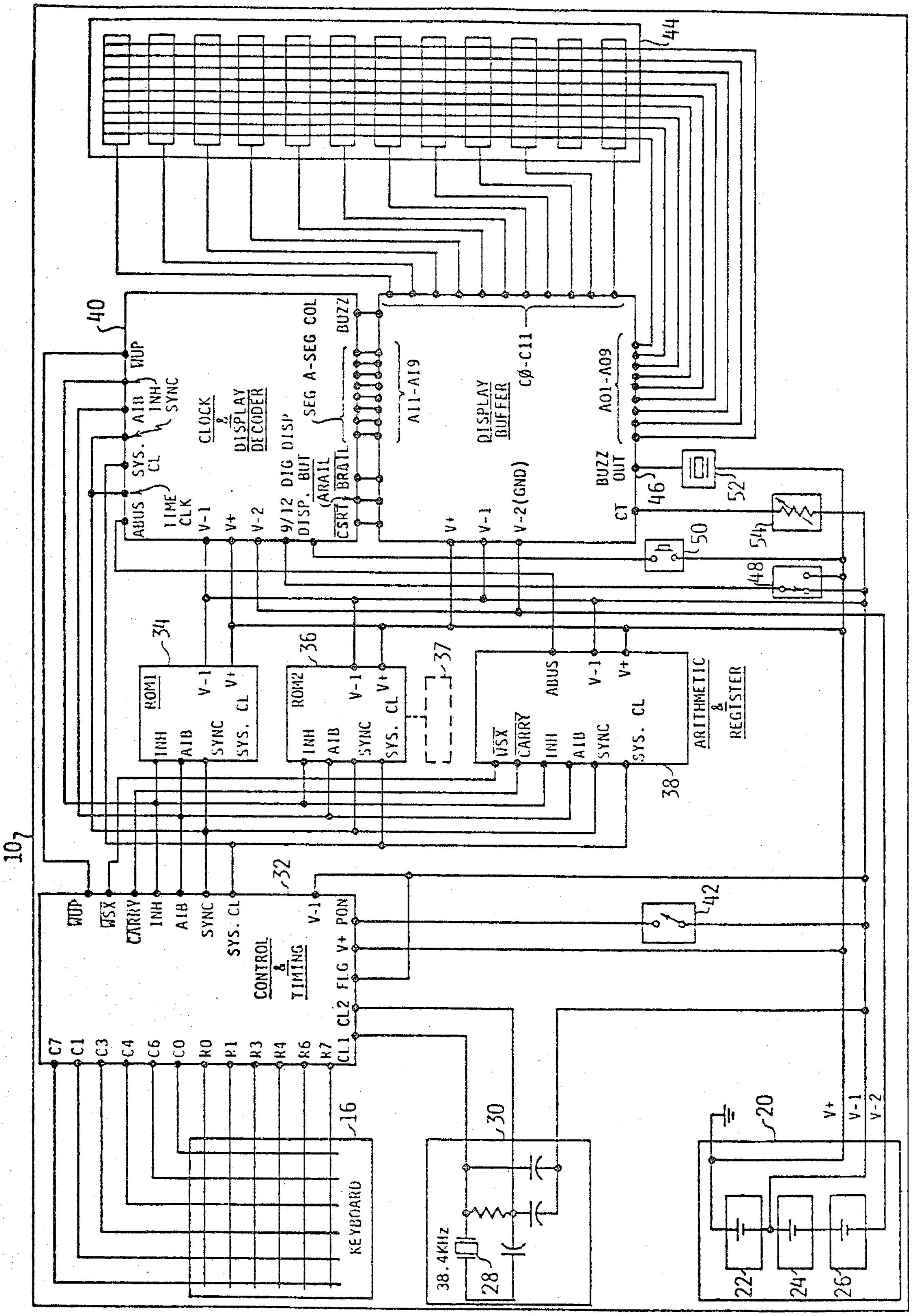
FIG. 2 is an overall block diagram of the preferred embodiment of the present invention.
Figure 3:
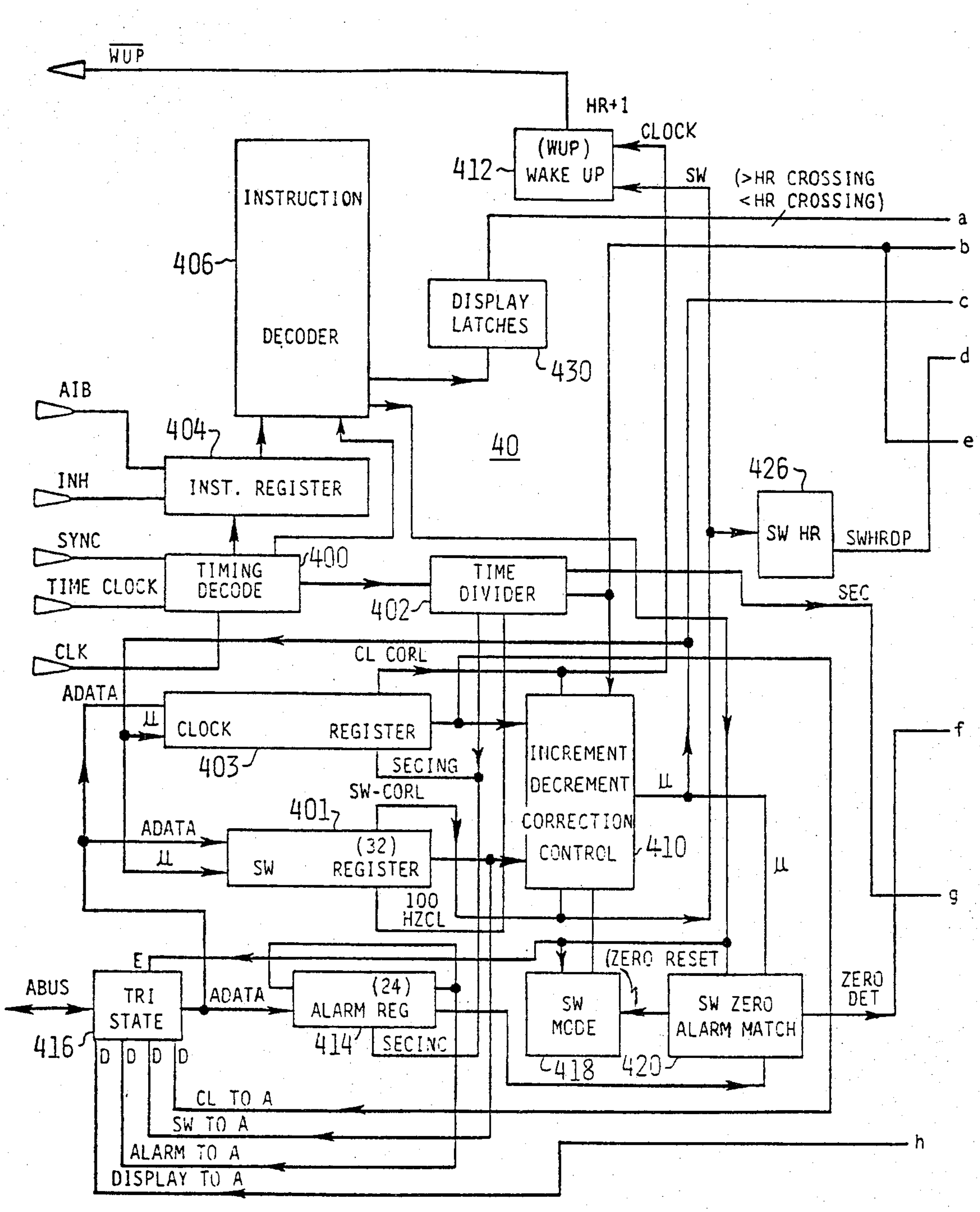
FIG. 3 is a more detailed block diagram of the clock circuitry of the preferred embodiment of the present invention.
Figure 4A:
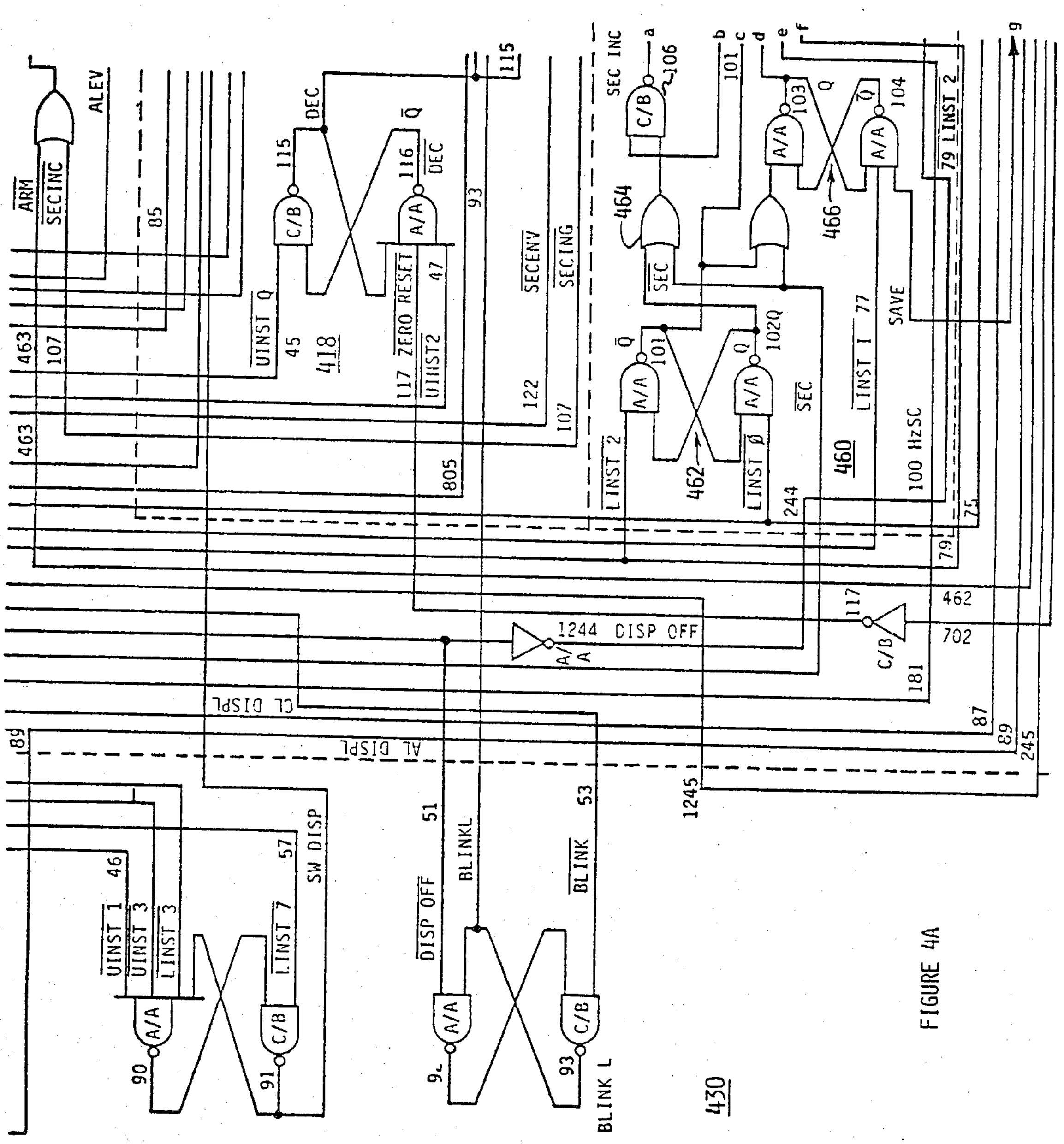
FIGS. 4A and 4B are detailed schematic diagrams of circuitry in the preferred embodiment of the present invention including the hold circuit.
Figure 4B:
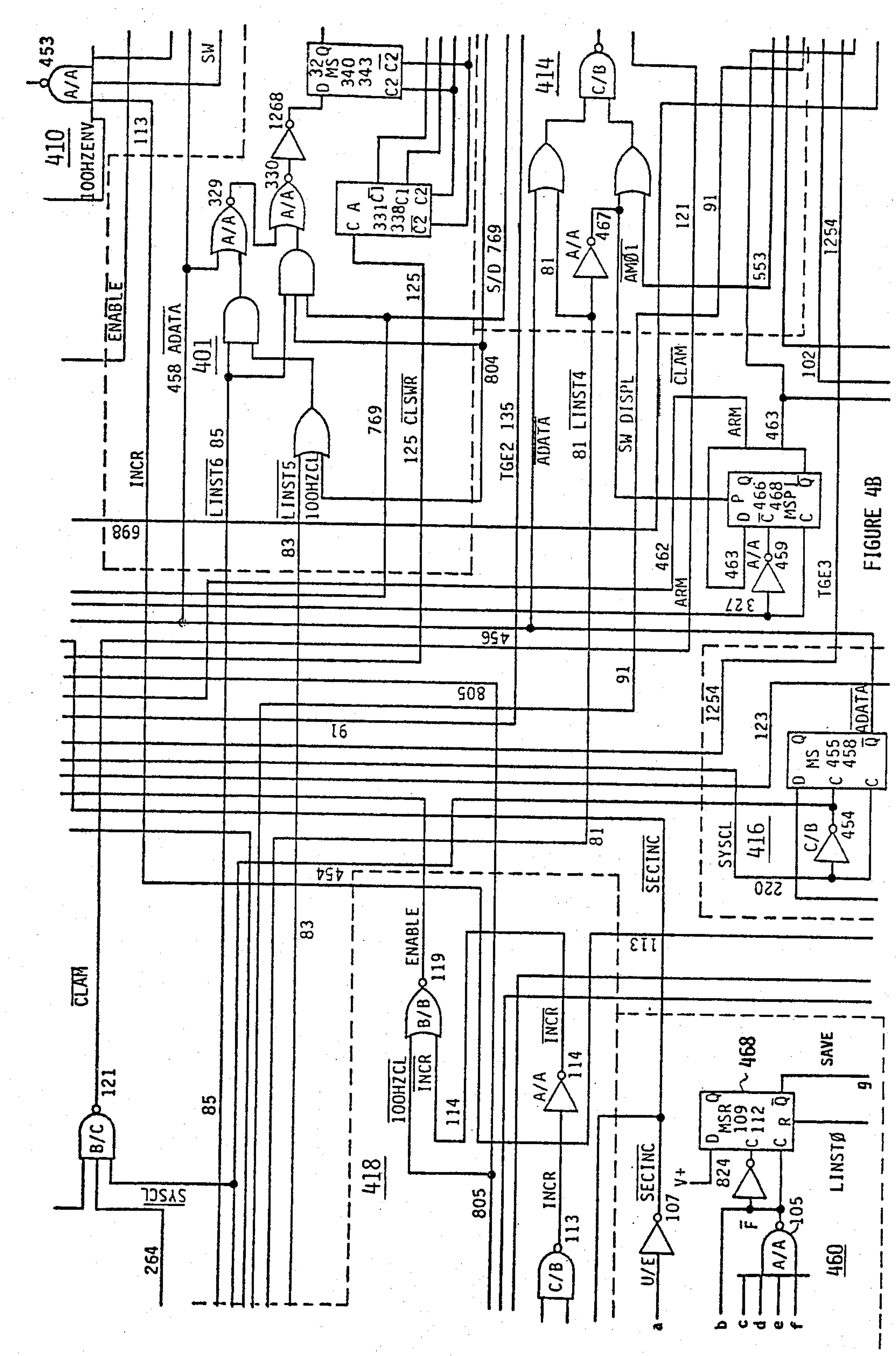

U.S. Pat. No. 4,158,285 entitled "Interactive Wristwatch Calculator" filed Feb. 9, 1976 by Edward A. Heinsen, Andre F. Marion and Thomas E. Osborne is hereby incorporated by reference in its entirety. FIGS. 1, 2 and 3 herein are FIGS. 1, 3 and 11A respectively in the referenced application. FIGS. 4A and 4B herein are substantially the same as FIGS. 12M' and 12N' in the referenced application, with the addition of some reference characters to permit a more detailed description. The operation of the clock and calculator circuits in the watch/calculator is thoroughly described in the referenced application and therefore will not be repeated herein; the following description gives further detail about the operation of hold circuit 460 shown in FIGS. 4A and 4B. The circuitry for holding increment signals is described on page 63, line 22 and following of the referenced patent application and the operation of hold circuit 460 shown in FIGS. 4A and 4B is given below.

When a user of the watch/calculator initiates a function which calls for the transfer of time data to the calculator circuitry on arithmetic and register circuit chip 38, shown in FIG. 2, a clock to A (CL→A) instruction is generated. This instruction transfers the contents of the clock register 403, shown in FIG. 3, to the arithmetic and register chip 38 via the A bus. The clock to A instruction causes another instruction, Line Instruction O (LINST $\phi$), to be generated; and this instruction appears at one of the inputs to a latch 462 shown in FIG. 4A. This instruction causes the signal on output 102Q to be high or a logical 1, and this output signal is applied to one of the inputs of OR gate 464. The other input to OR gate 464 is the increment signal, here designated as $\overline{SEC}$. When the signal on output 102Q is high, the output signal of OR gate 464 is high, and that high output signal is applied to gate 106 which inhibits the increment signal that is normally applied to the clock register 403.

If during the time that the time data is in the calculator circuitry, an increment signal is generated on line $\overline{SEC}$, the increment signal will be applied to an input of gate 103 in a latch 466, setting the latch and making the signal on output 103Q high. The increment signal is thereby stored by latch 466. In addition, SAVE flip-flop 468 shown in FIG. 4B is reset by LINST $\phi$ so that the signal on output $\overline{Q}$ is high.

When the arithmetic operation being performed by the calculator circuitry is completed, the result of that operation will be returned to clock register 403 and, in addition, the calculator circuitry will generate an A to clock (A→CL) instruction. This instruction, in turn, generates LINST 2, and that instruction is applied to the input of the gate 101 in latch 462. The signal on output 101$\overline{Q}$ then goes high, making output signal 102Q go low which, in turn, causes gate 464 to remove the inhibit signal from gate 106. This will allow subsequent increment pulses to be applied to the clock register. At the same time, the increment signal that is saved in latch 466 will be applied to the clock register in the following manner.

A 100 Hz signal on line 181 is applied to the input of gate 105 to make its output signal go low for one word time. The output 105' of gate 105 is connected to an input of gate 106 if latch 466 has been set by an increment signal during the hold period. This will cause gate 106 to apply an extra increment signal to clock register 403, thus making up for the increment signal lost during the time that the time data was in the calculator circuitry. Save flip-flop 468 is also reset by the output of gate 105 so that the $\overline{Q}$ output signal of that flip-flop goes low, clearing latch 466 and making output signal 104$\overline{Q}$ high.

The circuitry disclosed requires that the calculator processor perform its operation within one second (the spacing betwen the increment pulses), and this is an easily met condition for the processor in the preferred embodiment. However, the circuit disclosed could be extended to include additional latches for saving additional increment signals, if desired, for more frequent increment pulses or longer processor operation cycles.

Alternatively, arithmetic operations may be performed directly in the clock register without removing the time data. A number stored in a data register may be added to the time data by incrementing the time data with a number of pulses equal to the number in the data register. This may be accomplished, for example, by using the 100 Hz signal n line 181 to increment the clock register and decrement the data register. When the number in the data register reaches zero, the incrementing is terminated. This procedure may be used for changing one part of the time data, such as the hour, to correct for time zone changes.

During the time the arithmetic operation is being performed by incrementing the time data, a time increment signal may be produced. If it is coincident with an arithmetic increment signal, the time increment may be lost. Thus, to avoid this loss, the time increment signal will be held by the hold circuit as described above in response to a LINST $\phi$ instruction generated by an arithmetic operation instruction signal such as add. When the arithmetic operation is complete, the LINST 2 signal will be generated to release any held time increment signal.

We claim:

1. A clock calculator comprising:

an input device;

a display;

clock means coupled to the display for storing time data, the clock means including incrementing circuit means for producing an increment signal to periodically update the time data;

calculator circuit means coupled to the input device, the display and the clock means for performing arithmetic operations on time data from the clock means;

data transfer means connected to the calculator circuit means and the clock means for transferring data between the calculator circuit means and the clock means; and hold circuit means coupled to the clock means for holding any increment signal that occurs when arithmetic operations are being performed on the time data and for updating the time data in accordance with any held increment signal when the time data is transferred back to the clock means from the calculator circuit means.

2. A clock calculator as in claim 1 wherein the hold circuit means includes a latch circuit coupled to the calculator circuit means and the clock means for storing an increment signal.

3. A clock calculator as in claim 2 wherein the hold circuit means includes a second latch circuit coupled to the calculator circuit means, the clock means and the first-mentioned latch circuit for inhibiting the transfer of an increment signal to the clock means when arithmetic operations are being performed on the time data.

4. A clock calculator as in claim 3 wherein the first-mentioned latch circuit releases a stored increment signal in response to transfer of the time data back from the calculator circuit means to the clock means.

5. A clock calculator as in claim 1 wherein the input device is a keyboard including numeric keys for entering numeric data into the calculator circuit means and arithmetic function keys for causing the calculator to perform arithmetic operations on numeric and time data.

6. A clock calculator comprising:

an input device;

a display;

clock means coupled to the display for storing time data, the clock means including incrementing circuit means for producing an increment signal to periodically update the time data;

calculator circuit means coupled to the input device, the display and the clock means for performing arithmetic operations on time data; and hold circuit means coupled to the clock means for holding any increment signal that occurs when arithmetic operations are being performed on the time data and for updating the time data in accordance with any held increment signal when the arithmetic operation is completed.

7. A clock calculator as in claim 6 wherein the hold circuit means includes a latch circuit coupled to the calculator circuit means and the clock means for storing an increment signal.

8. A clock calculator as in claim 7 wherein the hold circuit means includes a second latch circuit coupled to the calculator circuit means, the clock means and the first-mentioned latch circuit for inhibiting the transfer of an increment signal to the clock means when arithmetic operations are being performed on the time data.

9. A clock calculator as in claim 8 wherein the first-mentioned latch circuit releases a stored increment signal in response to completion of the arithmetic operation.

10. A clock calculator as in claim 6 wherein the input device is a keyboard including numeric keys for entering numeric data into the calculator circuit means and arithmetic function keys for causing the calculator to perform arithmetic operations on numeric and time data.

* * * * *